US007891275B2

(12) United States Patent
Huang

(10) Patent No.: US 7,891,275 B2
(45) **Date of Patent: *Feb. 22, 2011**

(54) ADAPTER COUPLING DEVICE

(76) Inventor: Daniel Huang, P.O. Box 44-2049, Taipei (TW) 10668

( * ) Notice: Subject to any disclaimer, the term of this patent is extended or adjusted under 35 U.S.C. 154(b) by 0 days.

This patent is subject to a terminal disclaimer.

(21) Appl. No.: 12/385,222

(22) Filed: Apr. 2, 2009

(65) Prior Publication Data

US 2009/0188352 A1 Jul. 30, 2009

Related U.S. Application Data

(63) Continuation-in-part of application No. 11/703,629, filed on Feb. 8, 2007, now Pat. No. 7,448,302.

(51) Int. Cl.
*B25B 23/00* (2006.01)
*B23B 31/107* (2006.01)
*B25G 3/18* (2006.01)

(52) U.S. Cl. ......................... 81/438; 279/75; 81/177.85

(58) Field of Classification Search ......... 081/436–438, 081/177.85; 279/22, 75
See application file for complete search history.

(56) References Cited

U.S. PATENT DOCUMENTS

| | | | | |
|---|---|---|---|---|
| 4,828,277 | A * | 5/1989 | De Bastiani et al. | 279/75 |
| 5,934,384 | A * | 8/1999 | Wang | 81/177.85 |
| 6,270,085 | B1 * | 8/2001 | Chen et al. | 279/75 |
| 6,325,393 | B1 * | 12/2001 | Chen et al. | 279/75 |
| 6,637,755 | B2 * | 10/2003 | Chen et al. | 279/22 |
| 6,973,858 | B2 * | 12/2005 | Huang | 81/177.85 |
| 7,159,493 | B1 * | 1/2007 | Huang | 81/438 |

* cited by examiner

*Primary Examiner*—Hadi Shakeri

(57) ABSTRACT

An adapter coupling device includes an adapter having a polygonal recess for receiving a bit therein and a radial hole is defined in an outer periphery of the adapter so as to receive a bead therein. A spring and a positioning block are received in the adapter and the positioning block includes stepped receiving space and an outer surface. An outer sleeve is mounted to the adapter and a spring is located therebetween. The outer sleeve has a annular groove and an inclined inner surface defined in the inner periphery thereof, wherein the inclined inner surface has a maximum inclination of 30 degrees relative to an axis of the outer sleeve. The bit can be inserted into the polygonal recess of the adapter by one hand without pushing the outer sleeve upward. The inclined inner surface of the outer sleeve pushes the bead to position the bit.

4 Claims, 8 Drawing Sheets

ADAPTER COUPLING DEVICE

This is a Continuation-In-Part application of Applicant's former U.S. application Ser. No. 11/703,629, filed Feb. 8, 2007, now U.S. Pat. No. 7,448,302.

BACKGROUND OF THE INVENTION

Description of the Prior Art

Applicant's former invention is disclosed in U.S. Pat. No. 7,448,302 which uses an outer sleeve with an inclined inner surface which presses beads in radial direction to position a bit. The inclination of the inclined inner surface is about 30 degrees and an angle between the beads is in a range of 45 to 135 degrees. The bit can be directly inserted into the adapter without pulling the outer sleeve which is slightly moved in the same insertion direction and the bit is positioned by the beads. When removing the bit, the sleeve is move a distance and the user does not need to move the sleeve continuously, the bit can be pulled out from the adapter. The outer sleeve is moved in the direction that the bit is removed from the adapter when removing the bit so that the bit does not drop from the adapter by unintentional impact to the outer sleeve during use.

The U.S. Pat. No. 7,448,302 improves the drawbacks that the conventional adapter has to insert the bit to the adapter by two hands and the outer sleeve has to be pulled downward when removing the bit from the adapter, the downward movement of the outer sleeve might happen by unintentional impact to the outer sleeve during use.

When the bit is in loosened status and oriented downward, the bit drops due to gravity and the user has to find it and re-install it to the adapter. Some beads are pressed by the inclined inner surface of the outer sleeve and some beads are pushed by the straight inner surface of the outer sleeve, however, it is experienced that the positioning of the beads are not secured enough so that the bit cannot be well positioned.

The inclination of the inclined inner surface of the outer sleeve has to be correct to position the bit, a well functioned position block is important to position or release the outer sleeve. The disclosed outer sleeve and the positioning block need to be further improved.

As shown in FIG. 8 which shows the invention of U.S. Pat. No. 6,457,916 and includes an adapter 40 having an outer sleeve 45 mounted thereto and a polygonal recess 41 is defined in the adapter so as to receive a bit therein. A large hole 42 and a small hole 43 are defined radially in the adapter 40 so as to received a large bead 421 and a small bead 431 therein respectively. A clip 44 is mounted to the adapter 40 and a spring 401 is mounted to the adapter 40, one end of the spring 401 is in contact with the clip 44 and the other end of the spring 401 is in contact with an inside 451 of the outer sleeve 45. By the arrangement, when the outer sleeve 45 is pushed upward, the spring 401 provides a force to allow the outer sleeve 45 to move back to its original position. The outer sleeve 45 includes a stepped inner wall 452 which presses the large bead 421 when the outer sleeve 45 is moved downward. A resilient member 46 is located at the inner bottom of the polygonal recess 41 and a spring 461 is located beneath the resilient member 46. The resilient member 46 includes a concaved outer periphery 462 in which the small bead 431 can be entered when the outer sleeve 45 is moved downward, and the large bead 421 is in contact with the bit 1. When the outer sleeve 45 is moved upward, the large bead 421 is not pressed by the stepped inner wall 452 and the small bead 431 is removed from the concaved outer periphery 462, the bit 1 is in loosened status and pushed out from the adapter 40. The invention cannot insert the bit 1 into the adapter 40 by one hand, the outer sleeve 45 has to be moved upward. When the bit 1 is loosened and points downward, the bit 1 immediately drops from the adapter 40.

FIG. 9 shows the disclosure of DE102004011579A1 which discloses an adapter 50 with an outer sleeve 55 mounted thereto and a polygonal recess 51 is defined in the adapter 50. A first groove 52 and a second groove 53 are defined in an outer periphery of the adapter 50 so as to receive two beads 521 and 531 respectively. An angle between the two beads 521, 531 is 120 degrees. A clip 54 is mounted to the adapter 50 and in contact with a triangular protrusion 502 so as to position the outer sleeve 55. A spring 501 provides a resilient force to the adapter 50 wherein the outer sleeve 55 includes an inclined inner surface. When the outer sleeve 55 is moved downward, the beads 521, 531 are pressed by the inclined inner surface to position the bit 1 in the adapter 50. When the outer sleeve 55 is moved upward, the beads 521, 531 are released and the bit can be removed from the adapter 50. The bit 1 of this invention cannot be inserted into the adapter 50 by one hand and the outer sleeve 55 has to be moved upward to allow the insertion of the bit 1. When the bit 1 is in loosened status and pointed downward, the bit 1 drops from the adapter 50.

The present invention intends to provide an adapter coupling device that allows the user to insert the bit into the adapter with one hand and the bit does not drop when it is loosened and pointed downward.

SUMMARY OF THE INVENTION

The present invention relates to an adapter coupling device which comprises an adapter having a polygonal recess defined therein for receiving a bit therein. A first radial hole and a second radial hole are defined in an outer periphery thereof so as to respectively receive a first bead and a second bead. A first spring and a positioning block are received in a circular recess in the adapter, wherein the positioning block has a receiving space defined radially in an outer periphery thereof and located corresponding to the first radial hole. The positioning block further has an outer surface.

An outer sleeve is mounted to the adapter and a second spring is mounted to the adapter and engaged with the outer sleeve. An annular groove is defined in an inner surface of the outer sleeve and located corresponding to second radial hole of the adapter. An inclined inner surface is defined in the inner surface of the outer sleeve and the inclined inner surface has a maximum inclination of 30 degrees relative to an axis of the outer sleeve. The inner surface of the outer sleeve pushes the second bead into the receiving space of the positioning block or the outer surface of the positioning block pushes the second bead out from the receiving space to positioning the outer sleeve.

The primary object of the present invention is to provide an adapter coupling device which allows the user to insert the bit into the polygonal recess of the adapter with one hand while the outer sleeve does not need to be pushed upward. The bit is positioned by a bead which is pressed by the inclined inner surface of the outer sleeve and the inclined inner surface has a maximum inclination of 30 degrees relative to an axis of the outer sleeve.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENTS

Figure 1:
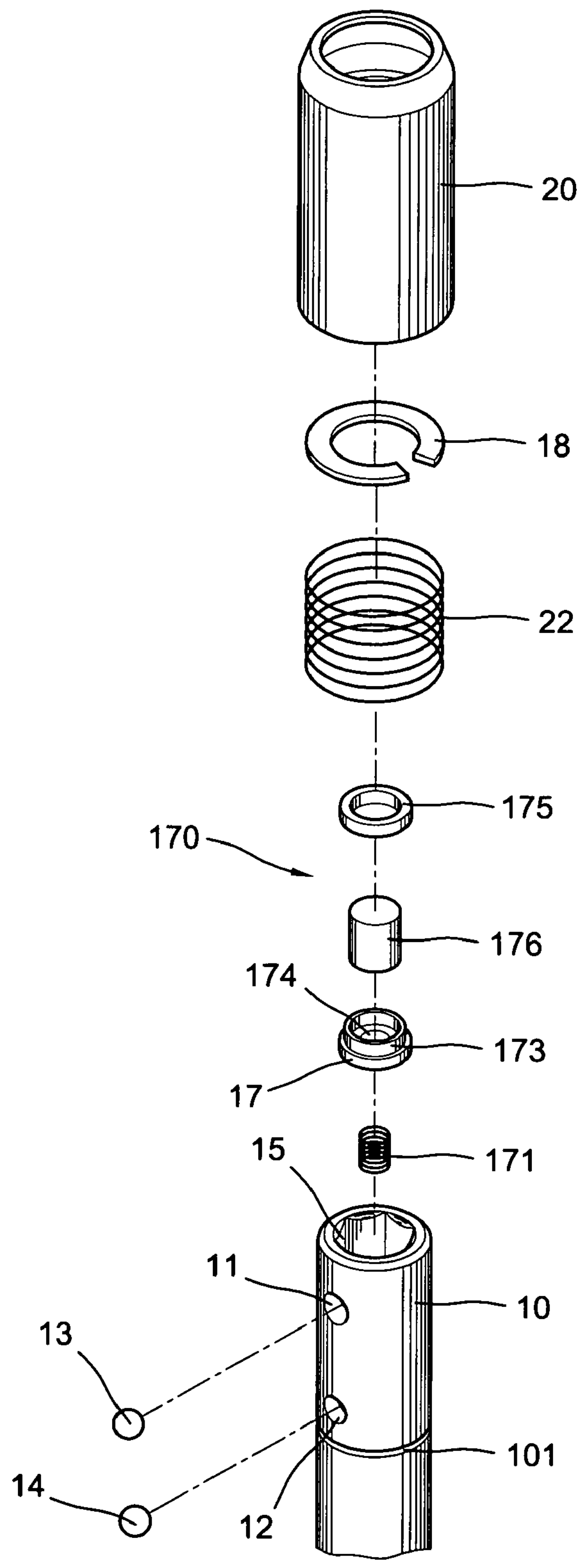
FIG. 1 is an exploded view to show the adapter coupling device of the present invention.
Figure 2:
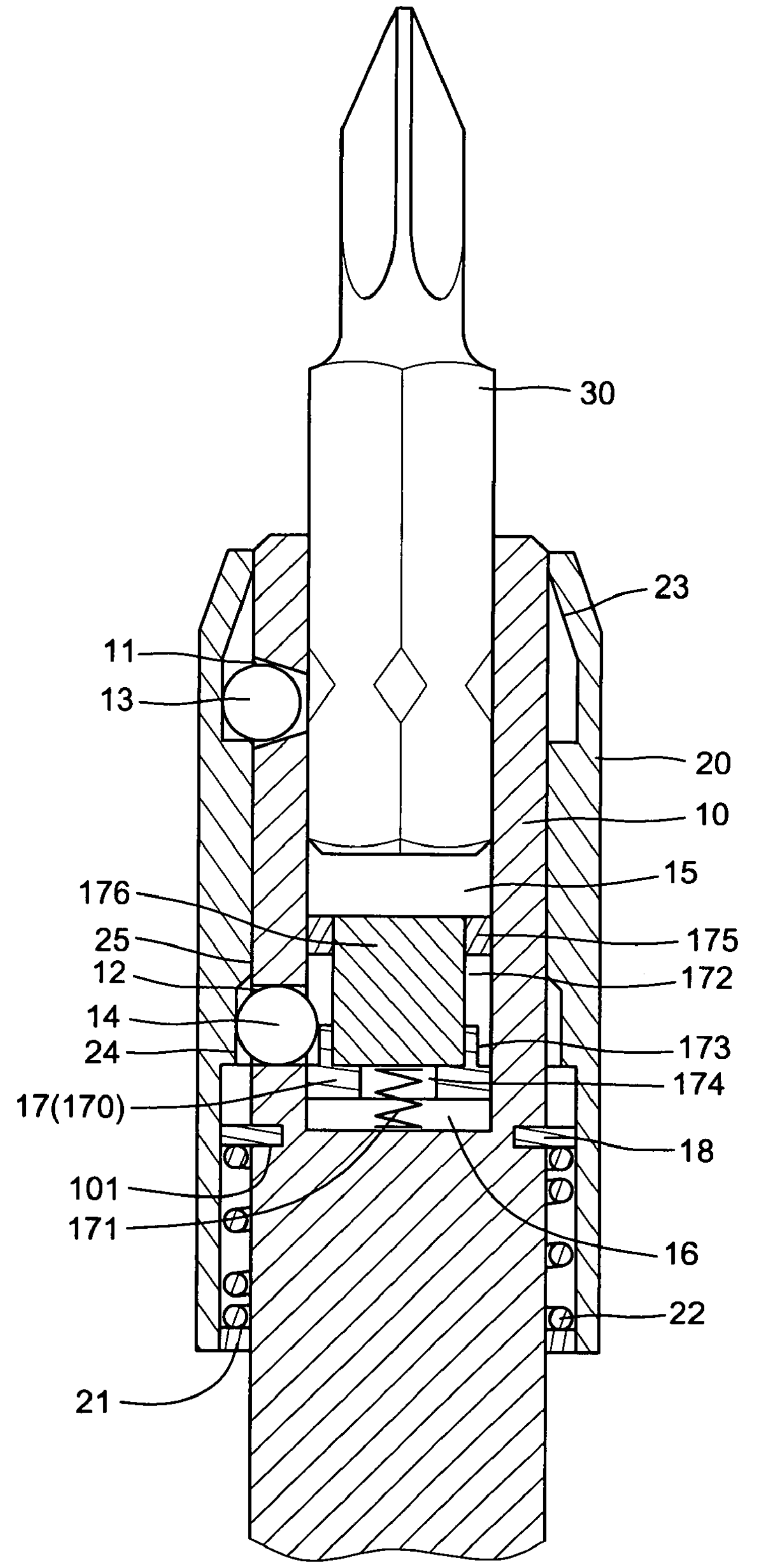
FIG. 2 is a cross sectional view to show the adapter coupling device of the present invention.

Referring to FIGS. 1 and 2, the adapter coupling device of the present invention comprises an adapter 10 having a polygonal recess 15 defined therein for receiving a bit 30 therein, a first radial hole 11 and a second radial hole 12 are defined in an outer periphery thereof. A first bead 13 such as a spherical bead, is received in the first radial hole 11 and a second bead 14 is received in the second radial hole 12. A circular recess 16 is defined in an inner end of the polygonal recess 15. A first spring 171 and a positioning block 17 are received in the circular recess 16. The base 170 includes a passage 174 defined therethrough and the first spring 171 is received in the passage 174. The first spring 171 is a compression spring. The positioning block 17 includes a top ring 175, a magnet 176 and a base 170, wherein the top ring 175 is mounted on the magnet 176 which is engaged with the base 170. The first spring 171 is biased at the bottom of the magnet 176. A receiving space 172 is defined radially in an outer periphery thereof and the receiving space 172 is located corresponding to the second radial hole 12. The receiving space 172 is defined between the top ring 175 and the base 170. An outer surface 173 extends from a top of the base 170.

An outer sleeve 20 is mounted to the adapter 10 and a second spring 22 is mounted to the adapter 10. An engaging groove 101 is defined in the outer periphery of the adapter 10 and a clip 18 is engaged with the engaging groove 101. A flange 21 extends inward from a lower end of the outer sleeve 20 and the second spring 22 is biased between the clip 18 and the flange 21. The second spring 22 provides a force to return the outer sleeve 20 relative to the adapter 10.

An annular groove 24 is defined in an inner surface 25 of the outer sleeve 20 and located corresponding to second radial hole 12 of the adapter 10. An inclined inner surface 23 is defined in the inner surface 25 of the outer sleeve 20 and located at a top portion of the outer sleeve 20. The inclined inner surface 23 has a maximum inclination of 30 degrees relative to an axis of the outer sleeve 20.

Figure 3:
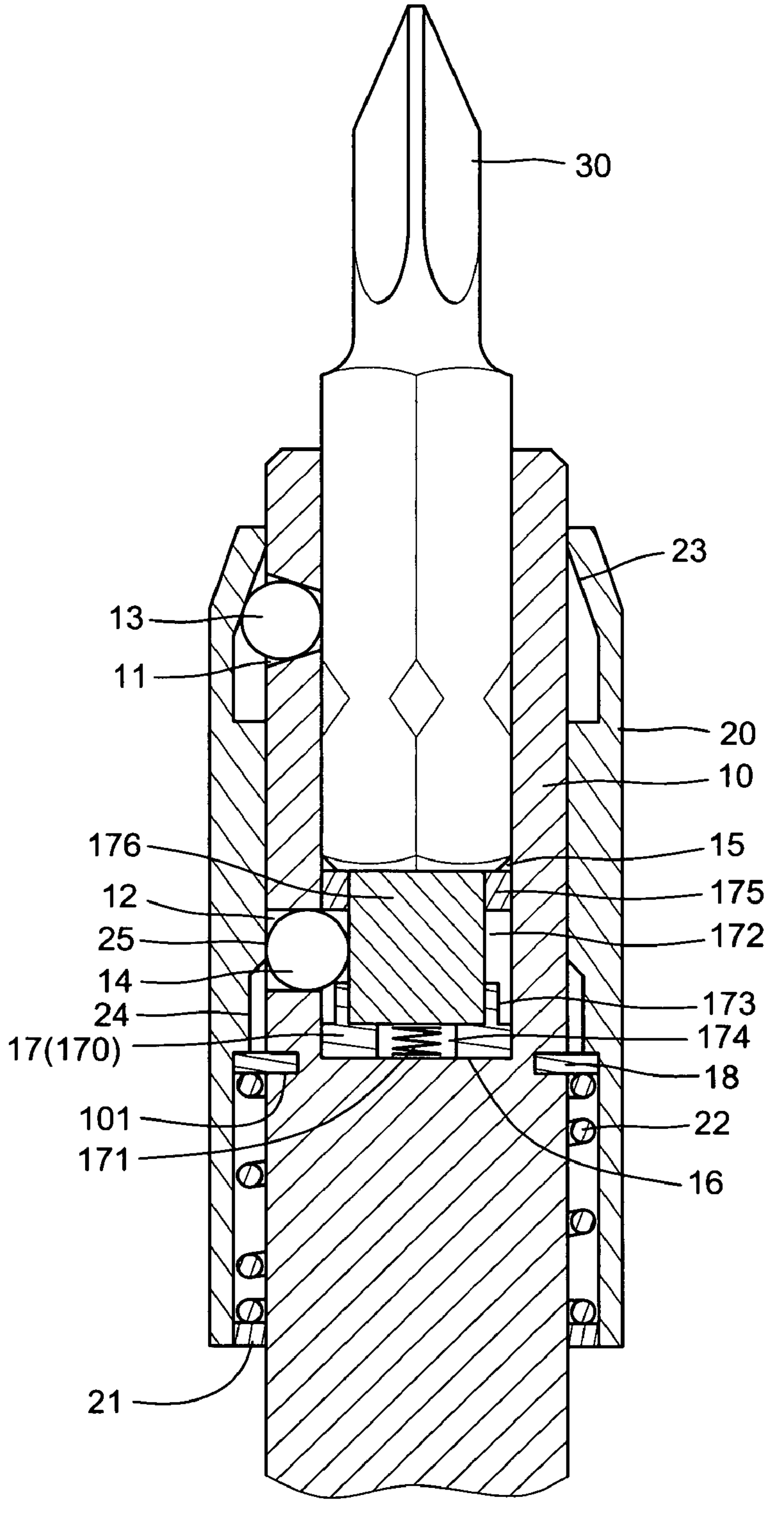
FIG. 3 is a cross sectional view to show that a bit is positioned by the adapter coupling device of the present invention.
Figure 4:
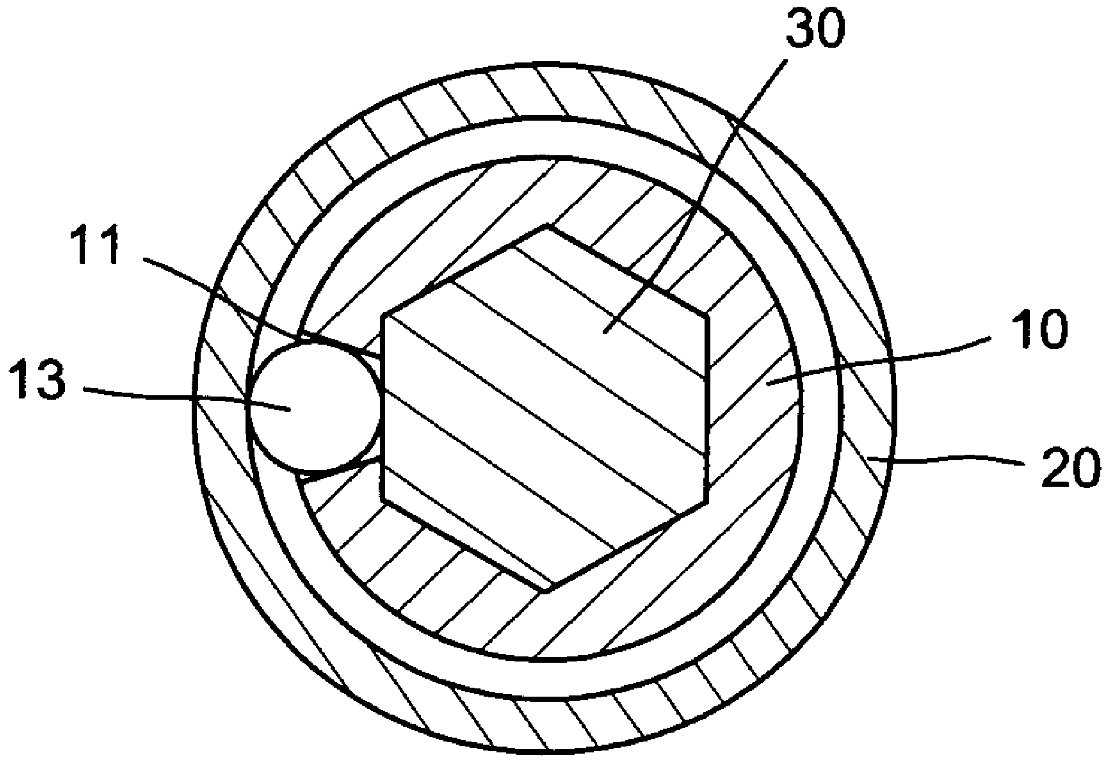
FIG. 4 is an cross sectional view to show that the bead in the adapter contacts against the bit.

Referring to FIGS. 3 and 4, the user can insert the bit 30 directly into the polygonal recess 15 of the adapter 10 by one hand and does not need to push the outer sleeve 20 upward. When inserting the bit 30 into the polygonal recess 15, the bottom of the bit 30 reaches to the conjunction portion of the polygonal recess 15 and the circular recess 16, the outer sleeve 20 is moved slightly in the direction of the insertion because the second spring 22 pushes the outer sleeve 20. Therefore, the outer sleeve 20 does not need to be pushed upward and the bottom of the bit 30 pushes the positioning block 17 which is slightly lowered so that the outer surface 173 pushes the second bead 14 outward and the second bead 14 is received in the receiving space 172. When the outer sleeve 20 is lowered by the second spring 22, the inclined inner surface 23 pushes the first bead 13 in the first radial hole 11 to contact against the bit 30 which is then positioned in the polygonal recess 15.

When removing the bit 30 from the polygonal recess 15 of the adapter 10, the outer sleeve 20 is moved upward to let the annular groove 24 of the outer sleeve 20 be located corresponding to the second radial hole 12. The positioning block 17 is pushed upward by the first spring 171 so that the second bead 14 is pushed outward by the outer surface 173 and the second bead 14 is received in the annular groove 24 and the outer sleeve 20 is not moved temporarily. Therefore, the user does not need to keep to push the outer sleeve 20 and the inclined inner surface 23 does not press the first bead 13 which then does not the contact against the bit 30.

Although the bit 30 is not pressed by the first bead 13, the bit 30 is attracted by the magnet 176 so that the bit 30 does not drop from the adapter 10. The magnet 176 can also be replaced by a non-magnetic block. It is noted that the outer sleeve 20 is pushed upward to remove the bit 30, so that the bit 30 is not loosened even if an unintentional impact applied downward to the outer sleeve 20 during use.

Figure 5:
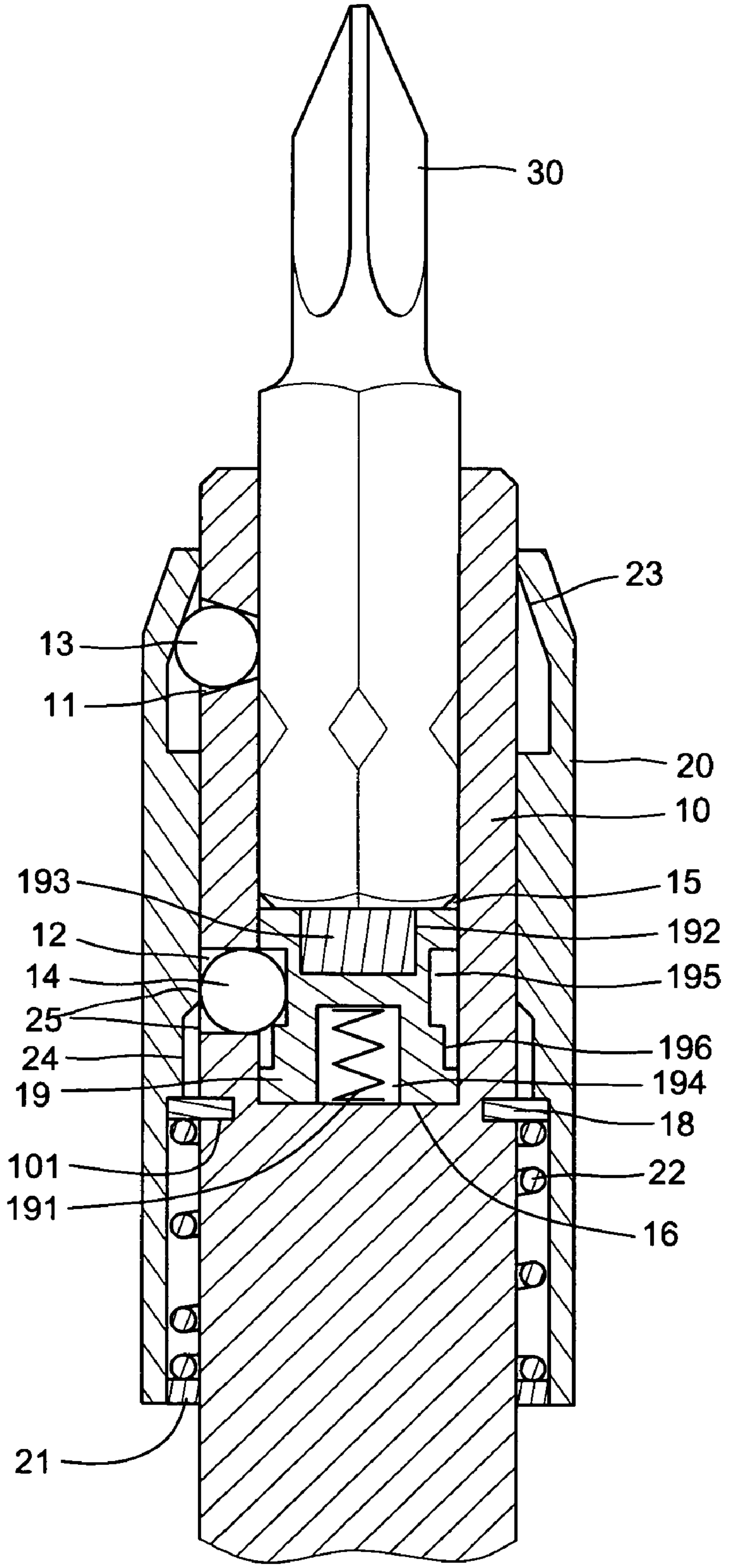
FIG. 5 is a cross sectional view to show a second embodiment of the adapter coupling device of the present invention.

As shown in FIG. 5, the second embodiment of the present invention shows that the positioning block 19 includes a top recess 192 and a magnet 193 is received in the top recess 192, a spring 191 is received in a bottom recess 194 in the bottom of the positioning block 19. The positioning block 19 has a receiving space 195 defined in an outer periphery thereof and an outer surface 196 is defined in the outer periphery of the positioning block 19. The receiving space 195 receives the second bead 14 and the outer surface 196 pushes the second bead 14 outward to perform the same function as the first embodiment described above.

Figure 6:
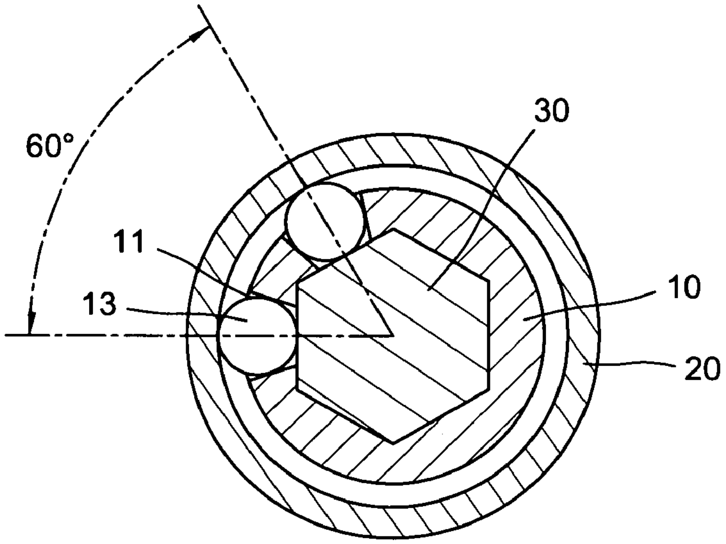
FIG. 6 is a cross sectional view to show a third embodiment of the adapter coupling device of the present invention, wherein there are two first beads.

FIG. 6 shows a third embodiment of the adapter coupling device of the present invention, wherein there are two first beads 13 received in two first radial holes 11. The angle between two lines passing the two first beads 13 and the axis of the polygonal recess 15 of the adapter 10 is at least 45 degrees.

Figure 7:
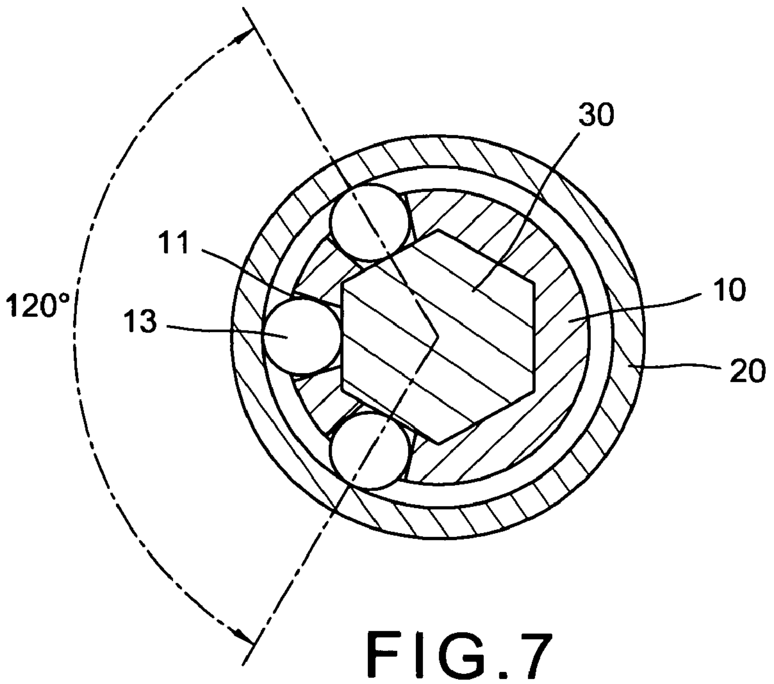
FIG. 7 is a cross sectional view to show a fourth embodiment of the adapter coupling device of the present invention, wherein there are three first beads.
Figure 8:
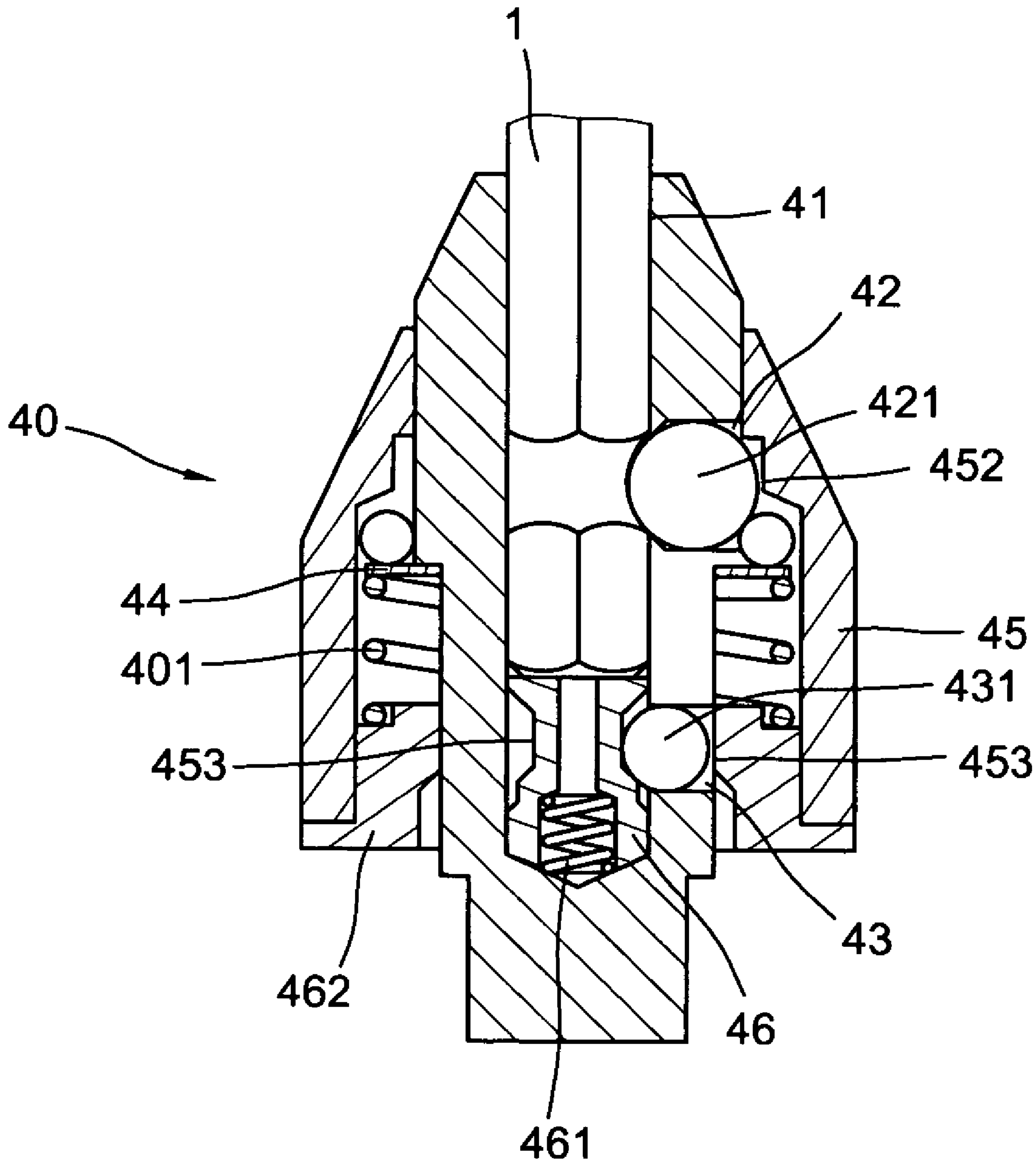
FIG.8 Prior Art
FIG. 8 is a cross sectional view to show a conventional adapter coupling device disclosed in U.S. Pat. No. 6,457,916.
Figure 9:
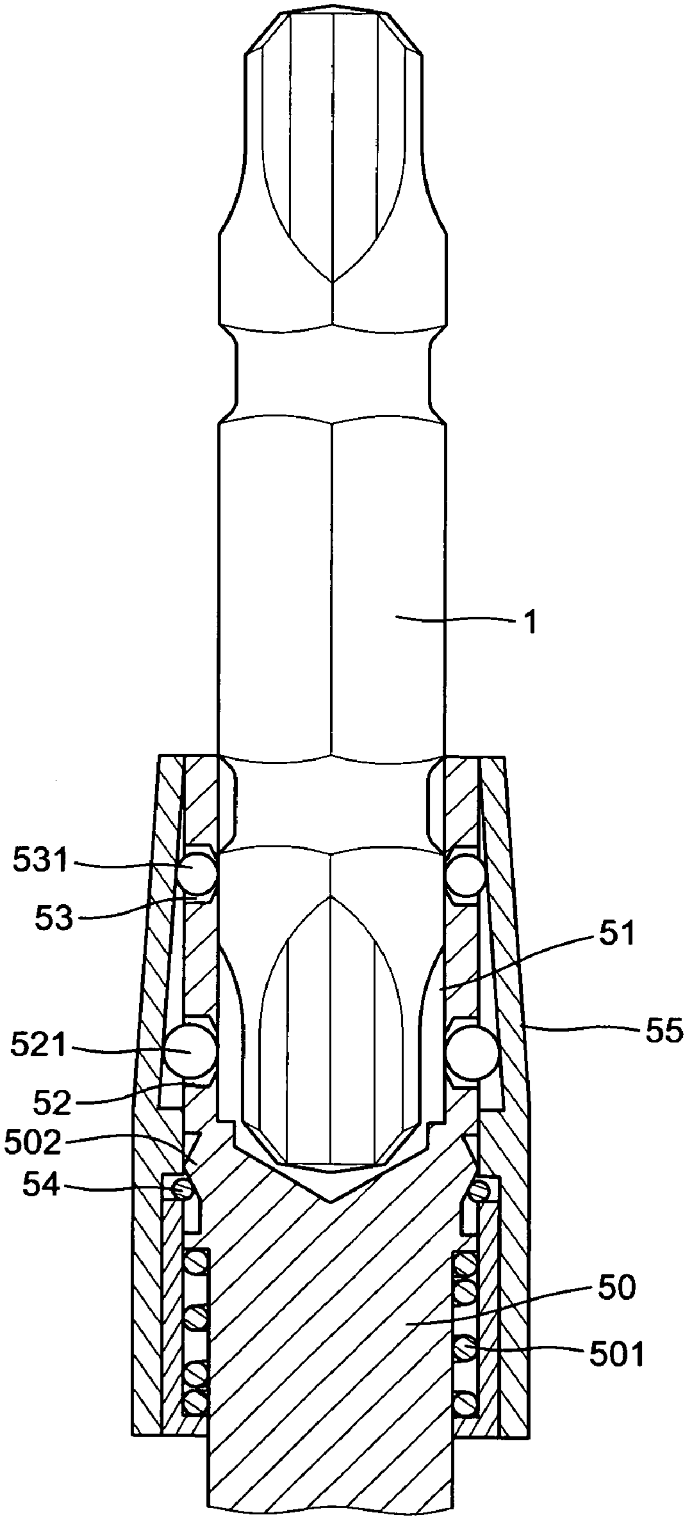
FIG.9 Prior Art
FIG. 9 is a cross sectional view to show a conventional adapter coupling device disclosed in DE102004011579.

FIG. 7 shows a fourth embodiment of the adapter coupling device of the present invention, wherein there are three first beads 13 received in three first radial holes 11. The maximum angle between two lines passing the two first beads 13 and the axis of the polygonal recess 15 of the adapter 10 is at least 135 degrees.

The angle between the first beads 13 in the first radial holes 11 is in a range of 45 to 135 degrees.

The maximum inclination of the inclined inner surface 23 is 30 degrees relative to an axis of the outer sleeve 20 so that the inclined inner surface 23 can press the first bead 13 properly and firmly position the bit 30. The angle between the two first beads 13 in the two first radial holes 11 is in a range of 45 to 135 degrees, so that the bit 30 is positioned in a stable status and the positioning block 17 ensures that the outer sleeve 20 is operated correctly.

While we have shown and described the embodiment in accordance with the present invention, it should be clear to those skilled in the art that further embodiments may be made without departing from the scope of the present invention.

What is claimed is:

1. An adapter coupling device comprising:

an adapter having a polygonal recess defined therein for receiving a bit therein, a first radial hole and a second radial hole defined in an outer periphery thereof, a first bead received in the first radial hole and a second bead received in the second radial hole, a circular recess defined in an inner end of the polygonal recess, a first spring and a positioning block received in the circular recess, the positioning block having a receiving space defined radially in an outer periphery thereof and the receiving space located corresponding to the second radial hole, the positioning block having an outer surface, the positioning block including a top ring, a magnet and a base, the top ring mounted on the magnet which is engaged with the base, the base including a passage defined therethrough and the first spring received in the passage and contacting an underside of the magnet, the receiving space being defined between the top ring and the base, the outer surface extending from a top of the base, and an outer sleeve mounted to the adapter and a second spring mounted to the adapter and engaged with the outer sleeve, the second spring providing a force to return the outer sleeve relative to the adapter, an annular groove defined in an inner surface of the outer sleeve and located corresponding to second radial hole of the adapter, an inclined inner surface defined in the inner surface of the outer sleeve and the inclined inner surface having a maximum inclination of 30 degrees relative to an axis of the outer sleeve, the inner surface of the outer sleeve pushing the second bead into the receiving space of the positioning block or the outer surface of the positioning block pushing the second bead out from the receiving space to positioning the outer sleeve.

2. The device as claimed in claim 1, wherein the adapter includes two first radial holes and an angle between the two first beads in the two first radial holes is in a range of 45 to 135 degrees.

3. The device as claimed in claim 1, wherein an engaging groove is defined in the outer periphery of the adapter and a clip is engaged with the engaging groove, a flange extends inward from a lower end of the outer sleeve, the second spring is biased between the clip and the flange.

4. The device as claimed in claim 1, wherein the first bead is a spherical bead.

* * * * *